United States Patent [19]

Glamb, deceased et al.

[11] 3,724,873
[45] Apr. 3, 1973

[54] THREE-WHEELED VEHICLE

[75] Inventors: Stanley L. Glamb, deceased, late of Garden City, Mich.; by Robert V. Glamb, administrator, Ann Arbor, Mich.

[73] Assignee: Helen D. Glamb, Widow, Garden City, Mich.

[22] Filed: Mar. 26, 1971

[21] Appl. No.: 128,314

[52] U.S. Cl. ................. 280/203, 280/204, 280/282
[51] Int. Cl. ............................................. B62k 27/02
[58] Field of Search ............... 280/202, 203, 282, 204

[56] References Cited

UNITED STATES PATENTS

| | | | |
|---|---|---|---|
| D158,453 | 5/1950 | Glamb | 280/203 UX |
| 1,550,162 | 8/1925 | Hansburg | 280/203 |
| D158,455 | 5/1950 | Glamb | 280/202 X |
| D158,454 | 5/1950 | Glamb | 280/202 X |
| 2,451,665 | 10/1948 | Bartolomeo | 280/7.15 |
| 1,218,943 | 3/1917 | Hudry | 280/202 X |
| 3,013,814 | 12/1961 | Becks | 280/203 |
| 3,152,838 | 10/1964 | Morehead | 280/282 X |

*Primary Examiner*—Kenneth H. Betts
*Assistant Examiner*—John P. Silverstrim
*Attorney*—Daniel G. Cullen et al.

[57] ABSTRACT

A vehicle having interchangeable and reversible parts with which it can be converted into a number of different types of vehicles. The parts of the vehicle include a frame, having a forked rear, a mounted fork at the front of the frame for rotational movement about a substantially vertical axis, to which is attached a front wheel, a handlebar attached to the fork, a seat attached to the frame, and an auxiliary seat assembly attached to the rear of the frame supported by a pair of rear wheels. The auxiliary seat assembly is reversible and removable.

5 Claims, 10 Drawing Figures

PATENTED APR 3 1973

INVENTOR.
STANLEY L. GLAMB.

BY
CULLEN, SETTLE, SLOMAN & CANTOR.
ATT'YS.

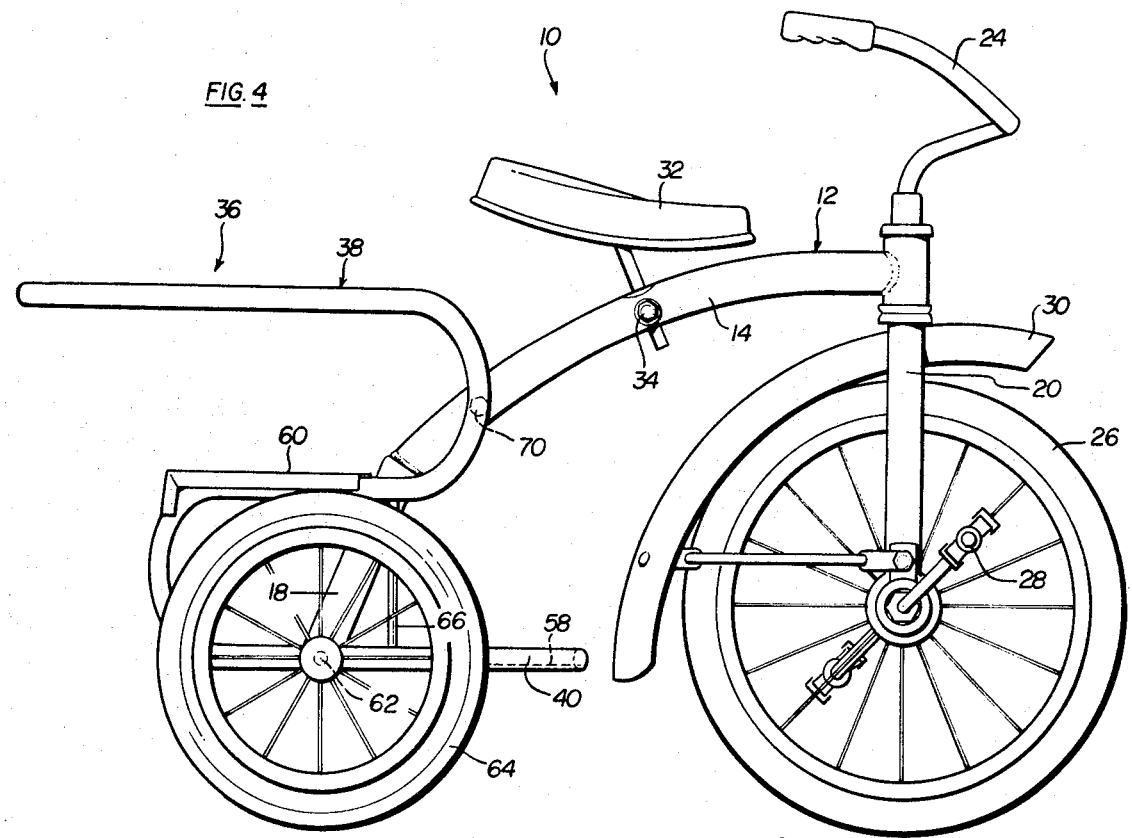
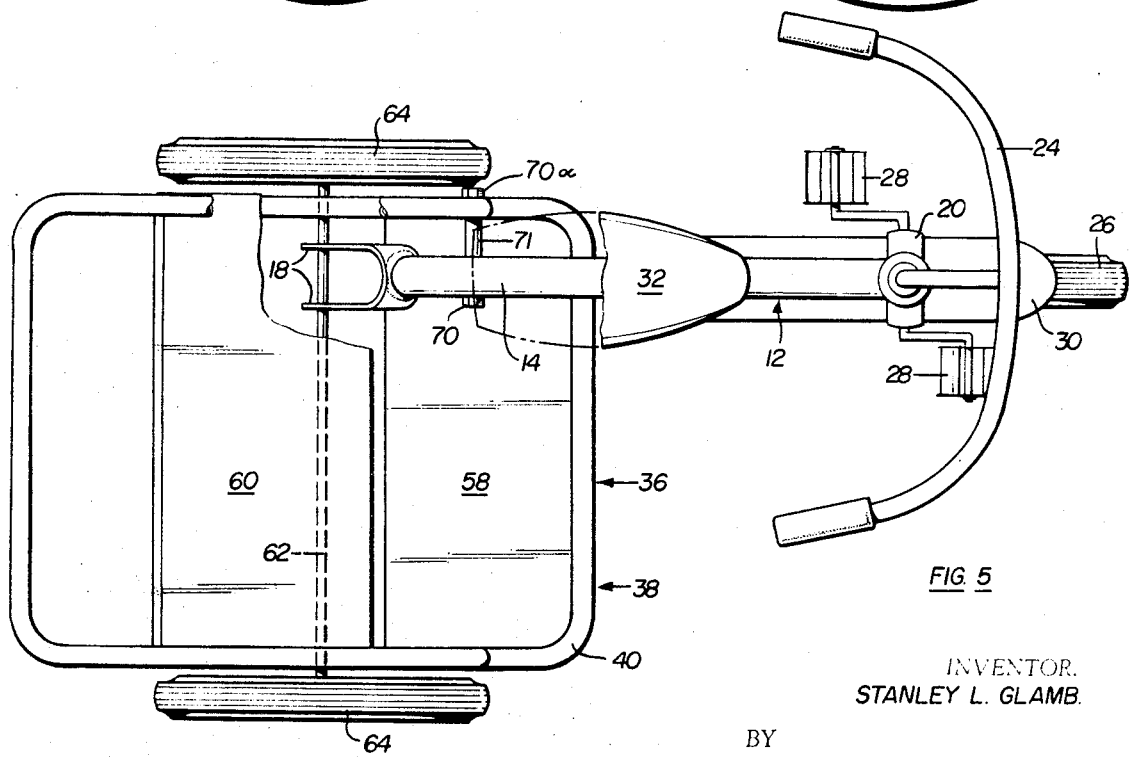

PATENTED APR 3 1973 3,724,873

INVENTOR.
STANLEY L. GLAMB.

BY
CULLEN, SETTLE, SLOMAN & CANTOR.

ATT'YS.

PATENTED APR 3 1973 3,724,873

INVENTOR.
STANLEY L. GLAMB.

BY
CULLEN, SETTLE, SLOMAN & CANTOR.

ATT'YS.

THREE-WHEELED VEHICLE

BACKGROUND OF THE INVENTION

Field of the Invention

This invention relates to a tricycle-like vehicle which can be modified and converted into a number of different types of vehicles.

Most young boys and girls develop an interest in riding vehicles at an early age. In general, children first learn to ride three-wheeled tricycles, and, as their motor development and coordination progresses, they learn to ride two-wheeled bicycles. If a child happens to be particularly skillful, he or she can ultimately learn how to ride a unicycle. Heretofore, it was necessary to purchase a tricycle, a bicycle, or a unicycle as a separate entity. It would be economically advantageous if one vehicle could be purchased, such as a tricycle, which could be converted into a bicycle or unicycle as the child progresses in his development. To date, this has not been possible.

A three-wheeled vehicle has now been invented, however, which, because of the interchangeability and reversibility of certain parts, can be converted from a three-wheeled vehicle into a bicycle or even a unicycle. In addition, the three-wheeled vehicle itself can be modified in several forms. Thus, the vehicle of this invention is adaptable for many purposes. Because it is so adaptable, it represents a substantial cost savings to the purchaser.

It is therefore an object of this invention to provide a three-wheeled vehicle which can be easily modified into various embodiments, including a two-wheeled bicycle or a unicycle.

This and other objects of the invention will be apparent from the specification to follow and the drawings, in which:

FIG. 4 is a side elevational view of an alternate embodiment of the three-wheeled vehicle of the invention;

FIG. 5 is a plan view of the vehicle of FIG. 4;

DESCRIPTION OF PREFERRED EMBODIMENTS

Figure 1:
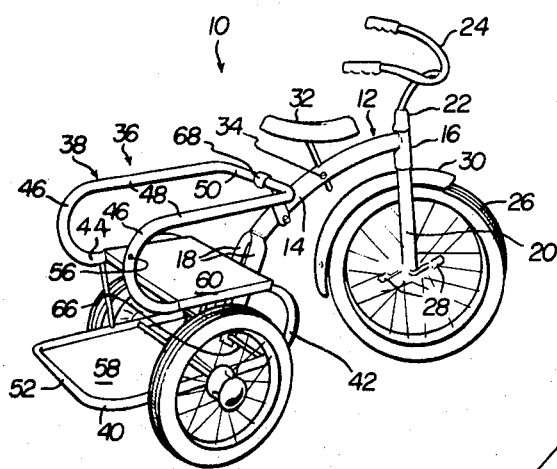
FIG. 1 is a perspective view of one embodiment of the three-wheeled vehicle of the invention.
Figure 2:
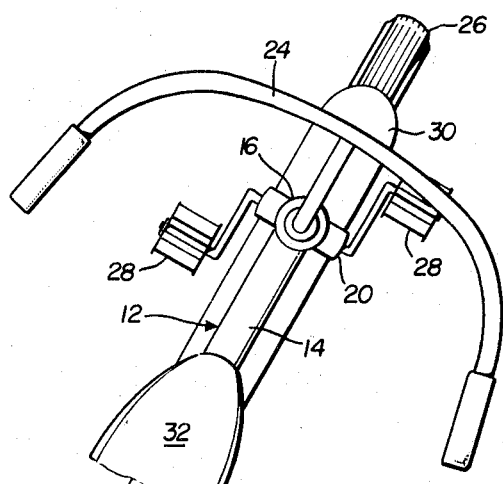
FIG. 2 is a plan view of the vehicle of FIG. 1.
Figure 3:
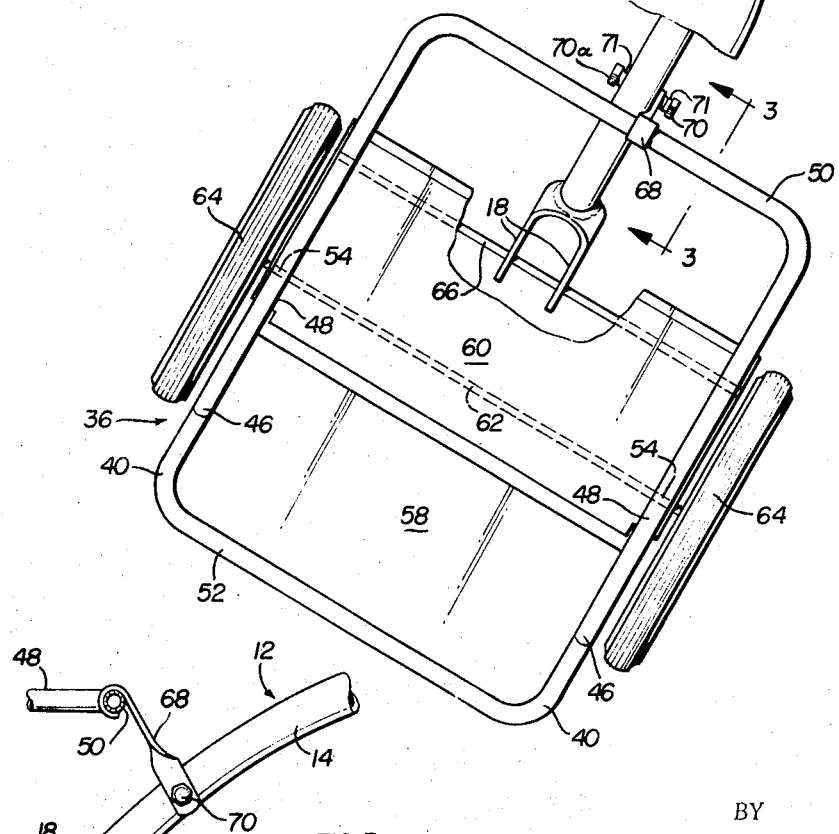
FIG. 3 is an enlarged view of the clamp for attaching the auxiliary seat assembly to the frame.

A preferred embodiment of the three-wheeled vehicle 10 of the invention is shown in FIGS. 1 and 2. The vehicle 10 comprises a central frame 12 comprising a curved tubular member 14 having a substantially vertically situated tubular member 16 attached to the front thereof. The rear of the frame is forked to provide opposed fork elements 18. A fork 20 having a neck 22 extending therefrom is mounted at the front of the frame 12 with the neck 22 extending through the tubular member 16. It is journaled in the usual manner. A handlebar 24 is attached to the neck 22 by conventional means.

A wheel 26 is mounted between the opposed elements of the fork 20 and has conventional pedals 28 attached to the axle thereof. A fender 30 is also mounted on the fork 20 covering the upper rear quandrant of the wheel.

A seat 32 is mounted on the frame at an intermediate point and is secured in position by a bolt 34.

An auxiliary seat assembly 36 is attached to the rear of the frame 12. The seat assembly 36 comprises a tubular frame 38, which is in the shape of parallel "S's" joined at the front and back. Each "S" comprises a lower horizontal tubular portion 40, a backwardly curved tubular portion 42 attached to the front end of the lower portion 40, an intermediate horizontal tubular portion 44 attached to the top of the curved portion 42, a frontwardly curving portion 46 attached to the back of the intermediate portion 44 and an upper horizontal tubular portion 48 attached to the top of the frontwardly curved portion 46. The opposed upper horizontal portions 48 are connected by a tubular member 40 at the front and the lower opposed horizontal portions 40 are connected by a tubular member 52 at the rear. In actuality, the frame 38 is all one piece and is made by a conventional tube bending method.

The frame 38 also has axially aligned bores 54 in opposed portions of the lower horizontal portions 40 at an intermediate location, and it has bore 56 in one of the upper curved portions thereof. A foot panel 58 is mounted between opposed lower horizontal portions 40, and a seat panel 60 is mounted between opposed intermediate portions 44. The panels are generally affixed by spot welding.

An axle 62 extends through the bores 54 in both sides of the frame 38. A pair of wheels 64 is mounted on the axle, one on each end, outside of the frame 38. Supporting struts 66 join the intermediate parallel portion 44 of each "S" to the lower horizontal portion 40. A rod 66 extends between the opposed lower horizontal portions 40 at the front ends thereof and also extends through the lower end of the fork 18 of the frame 14, which is situated at the center. The auxiliary seat assembly 36 is also secured at the top by a clamp 68 which is fastened with a bolt 70 and nut 70a to the frame. The bolt 70 is long enough so that in an alternate embodiment it can serve as an axle; thus, in order to secure the auxiliary seat assembly 36 rigidly to the frame, it may be necessary to insert spacers 71 around the bolt 70 adjacent the frame 12 in order to provide stability.

In an alternative embodiment (FIG. 4) the auxiliary seat assembly 36 is reversed and the axle 62 extends between the bores 54 in the frame 38 of the seat assembly 36 and through the fork elements 18 on the frame 12, which is at one side of the assembly. The wheels 64 are again mounted outside of the frame 38. This provides a forward facing auxiliary seat for the three-wheeled vehicle. The assembly 36 is attached to the frame 12 by the bolt 70 and nut 70a.

Figure 6:
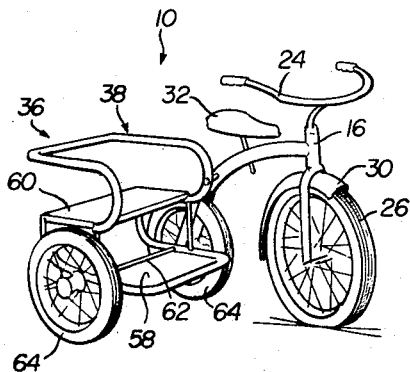
FIG. 6 is a perspective view of an alternate embodiment of the three-wheeled vehicle of the invention.
Figure 7:
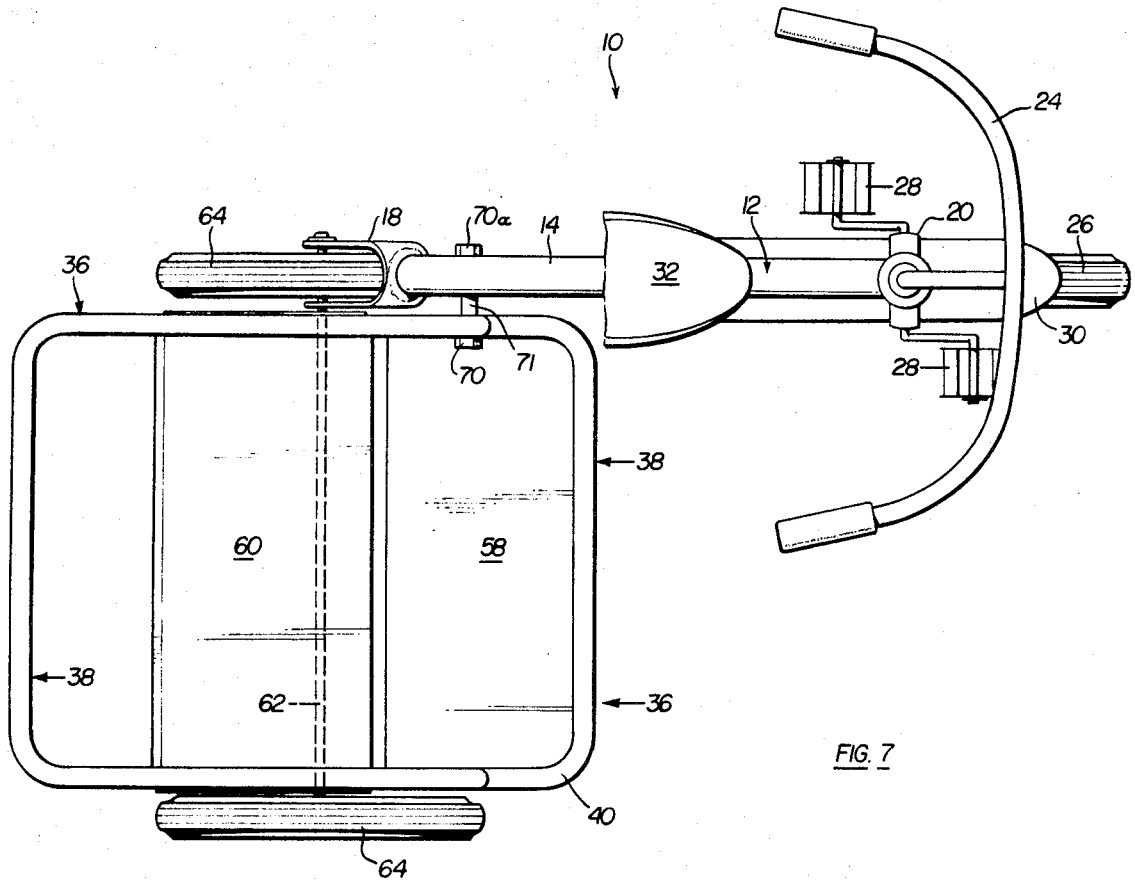
FIG. 7 is a plan view of the vehicle shown in FIG. 6.

In still another alternative embodiment (FIG. 6) the axle 62 extends through the lower horizontal portions 40 of the frame 38 of the auxiliary seat assembly 36 and the fork elements 18 which are situated outside of the frame 36. The wheels 64 are mounted on the outer ends of the axle 62. The seat assembly 36 is attached to the frame 12 by means of the bolt 70 and nut 70a. This provides a sidecar arrangement which has less stability than the second embodiment and gives a child the feeling that it is riding a two-wheeled vehicle rather than a three-wheeled vehicle, as is the case in the first and second embodiments. Due to the presence of the sidecar, however, the vehicle is prevented from turning over and has greater stability than simply a two-wheeled vehicle.

Figure 8:
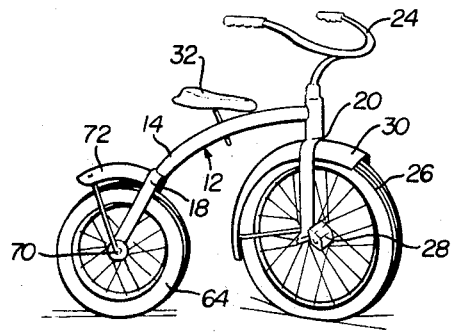
FIG. 8 is a side view of still another alternative embodiment of the invention.

If desired, however, the sidecar can be removed and one of the rear wheels 64 placed between the rear fork elements 18 of the frame 12 and secured there by means of the bolt 70 which is then extended through the orifices in the fork elements 18 and the wheel 64, and secured with the nut 70a. This provides a bicycle-type vehicle, as seen in FIG. 8. A fender 72 can also be attached to the frame 12 to prevent mud-splattering.

Figure 9:
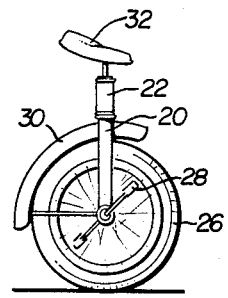
FIG. 9 is a side view of the unicycle embodiment of the invention.

In still another alternative embodiment, as seen in FIG. 9, the frame 12 and the handlebars 24 are removed from the neck 22 of the fork 20 and the seat 32 is then mounted on the neck 22 in the position which the handlebars ordinarily occupy. This results in a unicycle which can then be ridden in the usual manner for a unicycle.

Figure 10:
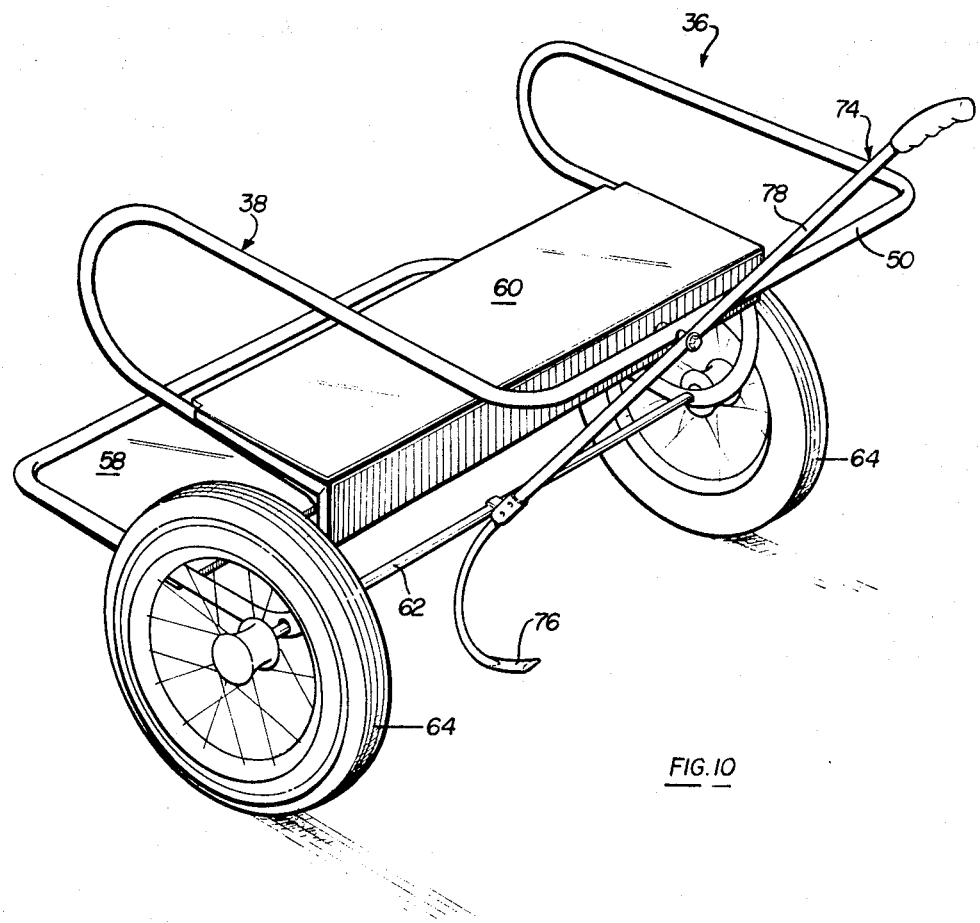
FIG. 10 is a perspective view of still another embodiment of the invention.

In yet another embodiment, as shown in FIG. 10, the auxiliary seat assembly 36 is removed entirely from the frame 12, and a handle 74 is attached to the backside thereof. The handle 74 is in the shape of an elongated fish hook. It has a curved base portion 76 and a backwardly extending shaft 78 extending therefrom. The handle 74 is attached to the axle 62 and the tubular member 50. In a rest position the base portion 76 rests on the ground providing the third point of a three point support for the seat assembly 36. When the handle is raised, the assembly can be pushed along on the two wheels 64, as like a push cart or rickshaw.

What is claimed is:

1. A movable vehicle comprising a frame having a forked rear section, a front steering assembly having a wheel mounted thereon mounted on said frame, means for rotating said wheel mounted on said steering assembly, a seat mounted on said frame, an auxiliary seat assembly fastened to said frame being supported by a pair of wheels mounted on opposed ends of an axle which extends through said seat assembly, and a cross rod on said seat assembly parallel to said axle and being slidably mounted through said forked rear section, said auxiliary seat assembly including opposed lower horizontal tubular portions mounting said axle and cross rod, opposed backwardly curved tubular portions attached to the front ends of said lower horizontal tubular portions, opposed intermediate horizontal tubular portions attached to the top of the opposed curved portions, opposed frontwardly curving portions attached to the backs of the opposed intermediate portions, and opposed upper horizontal portions attached to the top of the frontwardly curved portions, said upper horizontal portions being attached to each other at the front thereof by a first tubular member and said lower horizontal portions being attached to each other at the rear thereof by a second tubular member, and a clamp secured to and projecting from the frame, terminating in a transverse sleeve, said first tubular member being slidably mounted through said sleeve, whereby said seat assembly may be offset laterally relative to said frame by movements of said cross rod and first tubular member relative to said frame and forked rear section.

2. In the vehicle of claim 1, said seat assembly on disconnection of said axle, cross rod and clamp, being reversible end to end in a horizontal plane relative to said frame, with said axle extended through said forked rear section and with the said frontwardly curved portions facing rearwardly, and one of said latter curved portions clamped to said frame.

3. In the vehicle of claim 2, said forked rear section being located outside of said seat assembly.

4. A movable vehicle comprising a frame having a forked rear section, a front steering assembly having a wheel mounted thereon mounted on said frame, means for rotating said wheel mounted on said steering assembly, a seat mounted on said frame, an auxiliary seat assembly fastened to said frame being supported by a pair of wheels mounted on opposed ends of an axle which extends through said seat assembly, said auxiliary seat assembly including opposed parallel lower horizontal tubular portions mounted on said axle, opposed vertically parallel semi-circular tubular portions at their lower ends attached to opposed parallel one ends of said lower horizontal tubular portions, opposed parallel intermediate horizontal tubular portions at their one ends attached to the tops of said opposed semi-circular portions, opposed vertically parallel semi-circular portions attached at their lower ends to the other ends of said intermediate tubular portions, and opposed upper horizontal portions at their one ends attached to the tops of said second semi-circular portions, said upper horizontal portions at their other ends being attached to each other by a tubular member, and said lower horizontal portions at their other ends being attached to each other by a tubular member, said axle extending through said forked rear section; and a clamp interconnecting said frame and one of said second semi-circular portions, said clamp including a tubular spacer extending laterally between said frame and one of said second semi-circular portions; and a bolt extending through and secured to said frame, spacer and one of said semi-circular portions.

5. In the vehicle of claim 4, said forked rear section being located outside of said seat assembly, one of said wheels being positioned within said rear forked section.

* * * * *